(12) United States Patent
Kojima et al.

(10) Patent No.: US 7,445,587 B2
(45) Date of Patent: Nov. 4, 2008

(54) AUTOMATIC TOOL CHANGING METHOD AND DEVICE FOR MACHINE TOOL CONTROLLED BY NUMERICAL CONTROLLER

(75) Inventors: Kunio Kojima, Yamanashi (JP); Akihiko Fujimoto, Yamanashi (JP); Takeru Komiya, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/724,187

(22) Filed: Mar. 15, 2007

(65) Prior Publication Data

US 2007/0225139 A1    Sep. 27, 2007

(30) Foreign Application Priority Data

Mar. 27, 2006    (JP)    ............................ 2006-085711

(51) Int. Cl.
    *B23Q 3/157*    (2006.01)
(52) U.S. Cl. .............................. 483/56; 483/66; 483/39
(58) Field of Classification Search ................... 483/38, 483/39, 54, 55, 56, 66, 67
    See application file for complete search history.

(56) References Cited

U.S. PATENT DOCUMENTS

| | | | | |
|---|---|---|---|---|
| 3,909,923 | A | * | 10/1975 | Kurimoto et al. ............... 483/4 |
| 4,835,838 | A | * | 6/1989 | Hirose .......................... 483/54 |
| 4,955,127 | A | * | 9/1990 | Suda et al. .................... 483/54 |
| 5,020,210 | A | * | 6/1991 | Fujimoto ...................... 483/54 |
| 5,134,767 | A | * | 8/1992 | Yasuda ......................... 483/56 |
| 5,499,963 | A | * | 3/1996 | Fujimoto et al. .............. 483/56 |
| 6,471,451 | B2 | * | 10/2002 | Kojima et al. ............... 409/131 |

(Continued)

FOREIGN PATENT DOCUMENTS

JP    64-46137    3/1989

(Continued)

OTHER PUBLICATIONS

Notice of Reasons for Rejection issued in corresponding Japanese Patent Application No. 2007-055563 on May 15, 2007.

*Primary Examiner*—Dana Ross
(74) *Attorney, Agent, or Firm*—Staas & Halsey LLP (57) ABSTRACT

An automatic tool changing method and an automatic tool changing device for a machine tool with a numerical controller capable of reducing the occurrence of impact due to tool exchange with a simple structure. A turret that rotates about a pivot shaft is provided on an arm and holds multiple tools. A swing cam CS that cooperates with a swing roller provided on the turret is provided on a spindle head. As the spindle head descends the turret rotates due to the action of the swing roller and the cam CS and exchanges tools. In order to lessen the impact that occurs at this time, the velocity of the spindle head is controlled. The ideal swing velocity pattern for the turret is obtained, and from this swing velocity pattern the swing position of the turret at each moment is obtained. From the swing roller and cam CS positions at this position the position of the spindle head 34 is obtained. From the acquired spindle head position the spindle head velocity pattern is obtained, and the spindle head is controlled using this velocity pattern. As a result, an ideal swing pattern can be achieved, and therefore no impact arises.

10 Claims, 9 Drawing Sheets

U.S. PATENT DOCUMENTS

| | | | |
|---|---|---|---|
| 7,128,505 B2 * | 10/2006 | Sato et al. | 409/136 |
| 7,150,705 B2 * | 12/2006 | Kojima et al. | 483/69 |
| 2002/0004688 A1 * | 1/2002 | Kojima et al. | 700/193 |
| 2004/0176228 A1 * | 9/2004 | Kojima et al. | 483/67 |
| 2005/0009679 A1 * | 1/2005 | Fujimoto et al. | 483/39 |
| 2006/0094575 A1 * | 5/2006 | Fujimoto et al. | 483/39 |

FOREIGN PATENT DOCUMENTS

| | | |
|---|---|---|
| JP | 3-264234 | 11/1991 |
| JP | 06-000739 | 1/1994 |
| JP | 2006-272473 | 10/2006 |

* cited by examiner

| SEGMENT i | SET VELOCITY m/min | OVERRIDE % | (COMMAND VELOCITY=F×OV) |
|---|---|---|---|
| L1 | F=9 | OV1=200 | (9 × 2 = 18) |
| L2 | | OV2=190 | (9 × 1.9 = 17.1) |
| L3 | | OV3=170 | (9 × 1.7 = 15.3) |
| L4 | | OV4=150 | (9 × 1.5 = 13.5) |
| ⋮ | | ⋮ | |
| Li | | OVi=20 | (9 × 0.2 = 1.8) |

| INDEX i | MOTION AMOUNT Ai |
|---------|------------------|
| 1 | A1 |
| 2 | A2 |
| 3 | A3 |
| 4 | A4 |
| ⋮ | ⋮ |
| I | AI |

FIG.10b

| INDEX j | MOTION AMOUNT Bj |
|---------|------------------|
| 1 | B1 |
| 2 | B2 |
| 3 | B3 |
| 4 | B4 |
| ⋮ | ⋮ |
| J | BJ |

AUTOMATIC TOOL CHANGING METHOD AND DEVICE FOR MACHINE TOOL CONTROLLED BY NUMERICAL CONTROLLER

BACKGROUND OF THE INVENTION

1. Field of the Invention

The present invention relates to automatic tool changing method and device for automatically changing tools to be used in a machine tool, and in particular to automatic tool changing method and device for a machine tool controlled by a numerical controller.

2. Description of Related Art

An automatic tool changer for use in a CNC drill of a machine tool controlled by a numerical controller is designed to use the reciprocal vertical motion of a spindle on which the drill is mounted to replace a tool mounted on the spindle with a tool held in a turret. In order to shorten the time required for tool exchange as well as to lessen the impact that occurs during tool exchange, moving the turret in the same direction as the direction in which the spindle head moves when the turret swings to move toward and retreat from the spindle during tool exchange so as to reduce the difference in the relative velocities of the turret and the spindle and thereby lessen the impact is known (JP 2535479B).

There is also known a tool changer in which a plurality of grip arms for gripping tool holders are provided in a tool magazine so that each of grip arms is swung utilizing an axial motion of the spindle so that a tool holder attached to the spindle is changed with a desired one, and a velocity of the axial motion of the spindle is reduced in a region of performing the tool change so as to reduce an impact of a mechanical collision of the tool holder and the grip arm during the swing motion of the grip arm (see JP 2006-272473A).

Figure 11:
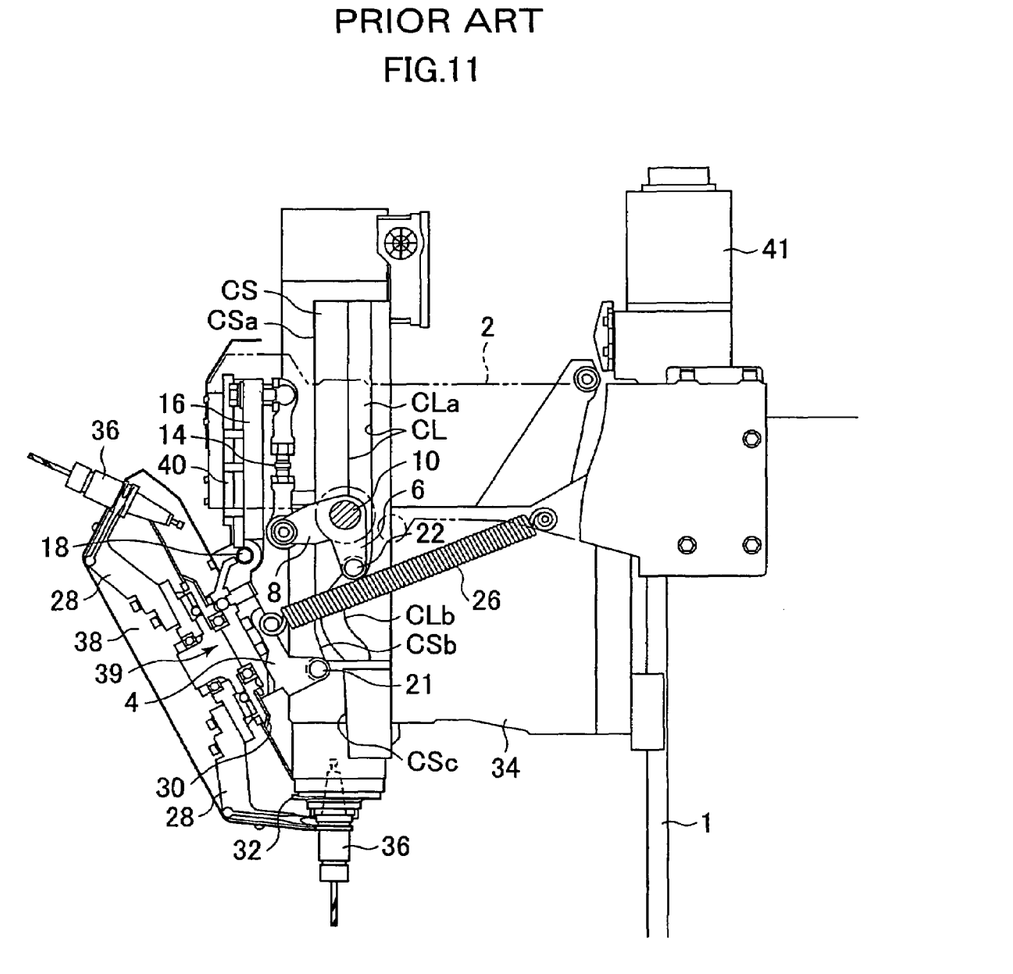
FIG. 11 is a schematic diagram showing a conventional automatic tool changer.

FIG. 11 is a schematic diagram of the automatic tool changer described in JP 2535479B that lessens the impact attendant upon tool exchange when changing tools.

The automatic tool changer is comprised of a turret 38 provided at the end of an arm member 2. The turret 38 has a plurality of grips 28 around its outer periphery, and with these tools the turret 38 holds tools. The turret 38 is equipped with a decelerator device 39 for selecting a desired tool by an allocation movement, so as to decelerate the rotation input via a turret gear 30 that engages a spindle gear 32 of the spindle and rotate the turret 38. The turret 38 holds a tool holder 36 via the plurality of grips 28. A crank 4 is fixedly mounted on the rear surface of the turret 38.

The spindle head 34 is designed so as to be reciprocally movable vertically (along the Z-axis) along a support column 1. On the spindle head 34 are provided a swing cam CS that rotates and swings the crank 4 and the turret 38 about a pivot shaft 18 and a lift cam CL for raising and lowering the crank 4 and the turret 38. The swing cam CS is comprised of a straight portion CSa, a curved portion CSb and then another straight portion CSc. The lift cam CL is comprised of a straight portion CLa and a curved portion CLb.

One end of the crank 4 is rotatably supported on the pivot shaft 18 and the other end is rotatably attached to a swing roller 21 that cooperates with the swing cam CS. An urging means 26 is attached to the center of the crank 4, and the crank 4 is urged counterclockwise around the aforementioned pivot shaft 18 shown in FIG. 11. In other words, the swing roller 21 is pressed against the cam surface of the swing cam CS by the urging means 26.

The pivot shaft 18 is connected to a lift slider 16 that is constructed so as to be able to move reciprocally vertically along a linear guide 40 that is fixedly mounted on the arm member 2. A lift link 14 is mounted on the other end of the lift slider 16. The lift link 14 is constructed so as to move reciprocally vertically as a single unit with the lift slider 16. A lift lever having two lift lever arm members 6, 8 and rotatable about a rotary shaft 10 is rotatably attached to the other end of the aforementioned lift link 14. The rotary shaft 10 is horizontally attached to the arm member 2, such that the lift levers 6, 8 are attached so as to be rotatable about the rotary shaft 10. A lift roller 22 that engages the lift cam CL is rotatably attached to the end of the lift lever 6. The lift roller 22, by engaging the lift cam CL, moves the lift link 14 and the lift slider 16 up and down in the drawing, which moves the turret 28 up and down.

The spindle head 34 is driven by a Z-axis servo motor 41. FIG. 11 shows the spindle head 34 raised and in a tool exchange state. During machining, the spindle head 34 is lowered and the swing roller 21 contacts the straight portion CSa of the swing cam CS, the crank 4 and the pallet 38 are rotated counterclockwise about the pivot shaft 18 from the state shown in FIG. 11, and the turret 38 is held in a state of retreat from the spindle. In addition, the lift roller 22 also contacts the straight portion CLa of the lift cam CL.

When a tool change order is input in the machining state, the Z-axis is driven by the Z-axis servo motor 41, the spindle head 34 starts to ascend, and the swing roller 21 moves to a swing cam CS swing starting position, that is, the starting point of the curved portion CSb. At this point, the Z-axis (the spindle head 34) stops and the orientation of the spindle starts. Then, when orientation finishes, the Z-axis (spindle head 34) once again starts to ascend. The ascent of the Z-axis (spindle head 34) moves the swing roller 21 over the curved portion CSb of the swing cam CS and the turret 38 starts to swing counterclockwise around the pivot shaft 18. The curved portion CSb of the swing cam CS is shaped so that the end of the grip 28 moves toward a V groove in the tool holder 36 without contacting the spindle gear 32 of the spindle, and a roller provided at the end of the grip 28 moves accurately over the V groove after the roller engages the V groove.

The ascent of the Z-axis (spindle head 34) causes the swing roller 21 to pass over the curved portion CSb and move to the straight portion CSc, where the swing movement ends.

By contrast, during deceleration of the swing, the lift roller 22 engages the curved portion CLb of the lift cam CL, causing the lift levers 6, 8 to rotate clockwise about the rotary shaft 10, raising the lift link 14 and the lift slider 16, and causing the crank 4 and the turret 38 to accelerate in the same direction as the ascent of the Z-axis (spindle head 34). As a result, toward the end of the swing movement, the turret 38 ascends with the Z-axis (spindle head 34) so that the difference between their relative velocities is zero and no impact occurs.

After the swing is finished, the Z-axis (spindle head 34) is fast forwarded so as to rise to an allocation point and simultaneously the turret 38 starts a lift movement for detaching the tool holder 36 from the spindle. The swing roller 21 moves over the flat portion CSc of the swing cam CS and the lift roller 22 moves back toward where it started from the peak position of the curved portion CLb, causing lift acceleration in the opposite direction of the direction in which the spindle head 34 moves (ascends). As the swing ends, the crank 4 and the turret 38 move under the spindle head 34, detaching the tool holder 36 from the spindle.

After the Z-axis (spindle head 34) has ascended, and in a state in which the spindle gear 32 and the decelerator device 39 turret gear are engaged, the spindle rotates and allocation of the desired tool is executed. After turret allocation is finished, the Z-axis (spindle head 34) descends along the Z-axis in reverse order of the procedure described above. Therefore, when the spindle takes the tool holder 36 from the grip 28, the relative velocity of descent of the Z-axis (spindle head 34) and the turret 38 is substantially zero. With the end of the return swing of the turret 38 the spindle head 34 returns to its original position and tool exchange is completed.

Figure 12A:
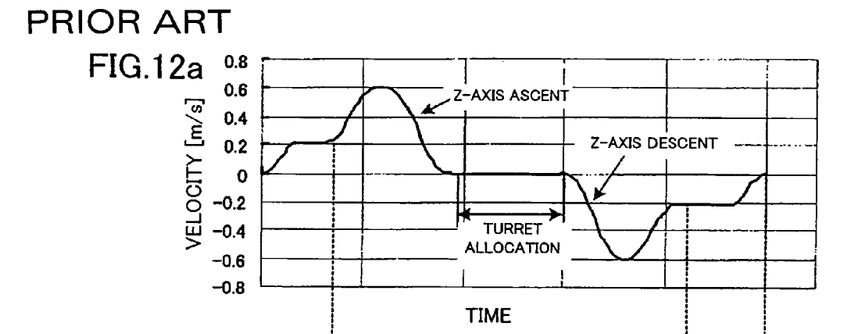
FIGS. 12a and 12b are diagrams showing a velocity pattern of a Z-axis motion, and a velocity pattern of a swing motion of a turret, respectively, in the conventional automatic tool changer.
Figure 12B:
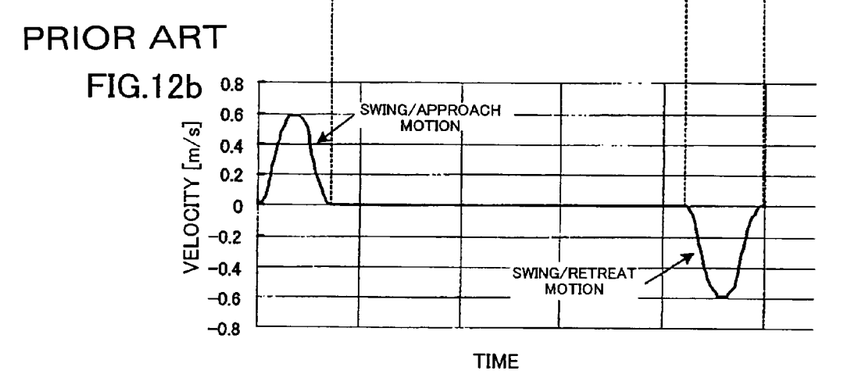

FIGS. 12a and 12b are diagrams of the movement velocity patterns (velocity diagram) of the Z-axis (the spindle head 34) (FIG. 12a) and of the turret 38 swing. FIGS. 12a and 12b show changes in velocity from the start of the swing of the turret 38 as the Z-axis (spindle head 34) ascends to descent of the Z-axis (spindle head 34) and the end of the swing.

As shown in FIGS. 12a and 12b, in the conventional tool changer, while the swing of the turret is being executed, the Z-axis (spindle head 34) is moved at a relatively low constant velocity. By changing the movement of the Z-axis (spindle head 34) with the vertical movement of the lift slider that supports the turret 38 with the lift cam CL so as to cause the turret 38 to move in the same direction as the Z-axis (spindle head 34), the relative velocity of the Z-axis (spindle head 34) and the turret 38 can be reduced to substantially zero, so that no impact arises at the end of the swing of the turret 38.

In the conventional automatic tool changer constructed so that no impact arises from tool exchange as described above, when the turret 38 is swung and either moved toward or retreated from the spindle, a cam structure is required that moves the turret vertically relative to the spindle head 34 and reduces the relative velocity of the turret 38 and the spindle head 34 (to zero difference in velocity) so as to lessen the impact. Specifically, the lift lever 8, the lift link 14, the lift slider 16, the lift roller 22, the linear guide 40 and the lift cam CL are required. However, machine tools generate dust when machining, and since this dust adheres to the cam groove (CL) the cam groove (CL) head must be cleaned. If this cleaning is inadequate, or if the lift roller 22 is insufficiently lubricated, friction between the cam groove (CL), the lift roller 22 and the like is sometimes generated. In such cases, the turret 38 looses its smooth swing and as a result the cam and the lift roller must be replaced.

Further, the cam mechanism (the lift lever 8, the lift link 14, the lift slider 16, the lift roller 22, the linear guide 40 and the lift cam CL) for raising and lowering the turret 38 described above has the disadvantage that it complicates the tool changer mechanism as a whole, increasing the cost of parts as well as assembly.

SUMMARY OF THE INVENTION

The present invention provides an automatic tool changing method and an automatic tool changing device for a machine tool controlled by a numerical controller capable of reducing an impact attendant upon a swing motion of a turret during tool exchange with a simple structure.

The method of the present invention is for changing a tool attached to a spindle of a machine tool, controlled by a numerical controller, with a desired tool by an automatic tool changer which comprises a spindle head rotatably supporting the spindle and arranged axially movable, a turret for holding one or more tools with a plurality of grips arranged along an outer periphery thereof, the turret being supported rotatably about a rotary axis for allocating a desired tool to a tool changing position and also swingably about a pivot axis for attaching/detaching the tool to/from the spindle, and a mechanism for making a swing motion of the turret towards and away from the spindle utilizing an axial motion of the spindle head. The method comprises: defining a target velocity pattern of the swing motion of the turret; determining angular positions of the turret with respect to time in the swing motion based on the target velocity pattern; determining axial positions of the spindle head with respect to time based on the determined angular positions of the turret with respect to time; preparing a motion program such that the spindle head takes the determined axial positions with respect to time; and controlling the axial motion of the spindle head according to the prepared motion program by the numerical controller so as to change the tool on the spindle with the desired tool.

An automatic tool changing device of the present invention changes a tool attached to a spindle of a machine tool controlled by a numerical controller with a desired tool. The automatic tool changing device comprises: a spindle head supporting the spindle rotatably and arranged axially movable; a turret for holding one or more tools with a plurality of grips arranged along an outer periphery thereof, the turret being supported rotatably about a rotary axis for allocating the desired tool to a tool changing position and also swingably about a pivot axis for attaching/detaching the tool to/from the spindle; a mechanism for making a swing motion of the turret toward and away from the spindle utilizing an axial motion of the spindle head; storage means storing axial motion data of the spindle head for a plurality of motion segments obtained by dividing the axial motion of the spindle head during the swing motion of the turret so that the swing motion of the turret is performed according to a target velocity pattern such that the swing motion towards the spindle is smoothly decelerated to an end point thereof and the swing motion away from the spindle is smoothly accelerated from a start point thereof, and so that a velocity of the axial motion of the spindle head has a minimum value at the end point of the swing motion of the turret towards the spindle and the start point of the swing motion of the turret away from the spindle; and spindle head driving means controlled by the numerical controller based on the axial motion data of the spindle head stored in the storage means to axially move the spindle head so as to make the swing motion of the turret.

The minimum value of the velocity of the axial motion of the spindle head in the axial motion data stored in the storage means may be zero.

The axial motion data of the spindle head stored in the storage means may comprise motion amounts and velocities in blocks of the plurality of motion segments, and the spindle head driving means may drive the spindle head based on the velocities and the motion amounts read from the respective blocks.

The axial motion of the spindle head during the swing motion of the turret may be divided by distribution periods in which the numerical controller distributes motion commands to respective control axes of the machine tool, and the axial motion data stored in the storage means may comprise motion amounts for respective distribution periods, and the spindle head driving means may drive the spindle head by the motion amounts read from the storage means at respective distribution periods.

The mechanism for making the swing motion of the turret may comprise a cam mechanism having a cam and a cam follower.

The axial motion data of the spindle head may comprise axial positions of the spindle head with respect to time determined based on angular positions of the turret with respect to time during the swing motion of the turret according to a target velocity pattern.

The angular positions of the turret with respect to time may be determined by integrating a velocity of the swing motion of the turret according to the target velocity pattern.

The mechanism for making the swing motion of the turret may comprise a cam mechanism having a cam provided integrally with the spindle head and a cam follower rotatably supported by the turret.

The axial positions of the spindle head stored in the storage means may be determined as axial positions of the spindle head at which the cam is in contact with the cam follower at the angular positions of the turret with respect to time.

The velocity of the spindle head is controlled so as to perfect the swing of the turret, and therefore nimble and fast tool exchange is achieved. At the same time, the lift mechanism that is required conventionally becomes unnecessary, eliminating problems relating to the durability of the constituent parts of the lift mechanism. In addition, eliminating the lift mechanism makes the construction extremely simple. As a result, the cost of the parts needed for the tool changer as well as the cost required to assemble the apparatus are greatly reduced, making it possible to obtain an even more inexpensive machine tool.

DETAILED DESCRIPTION

Figure 1:
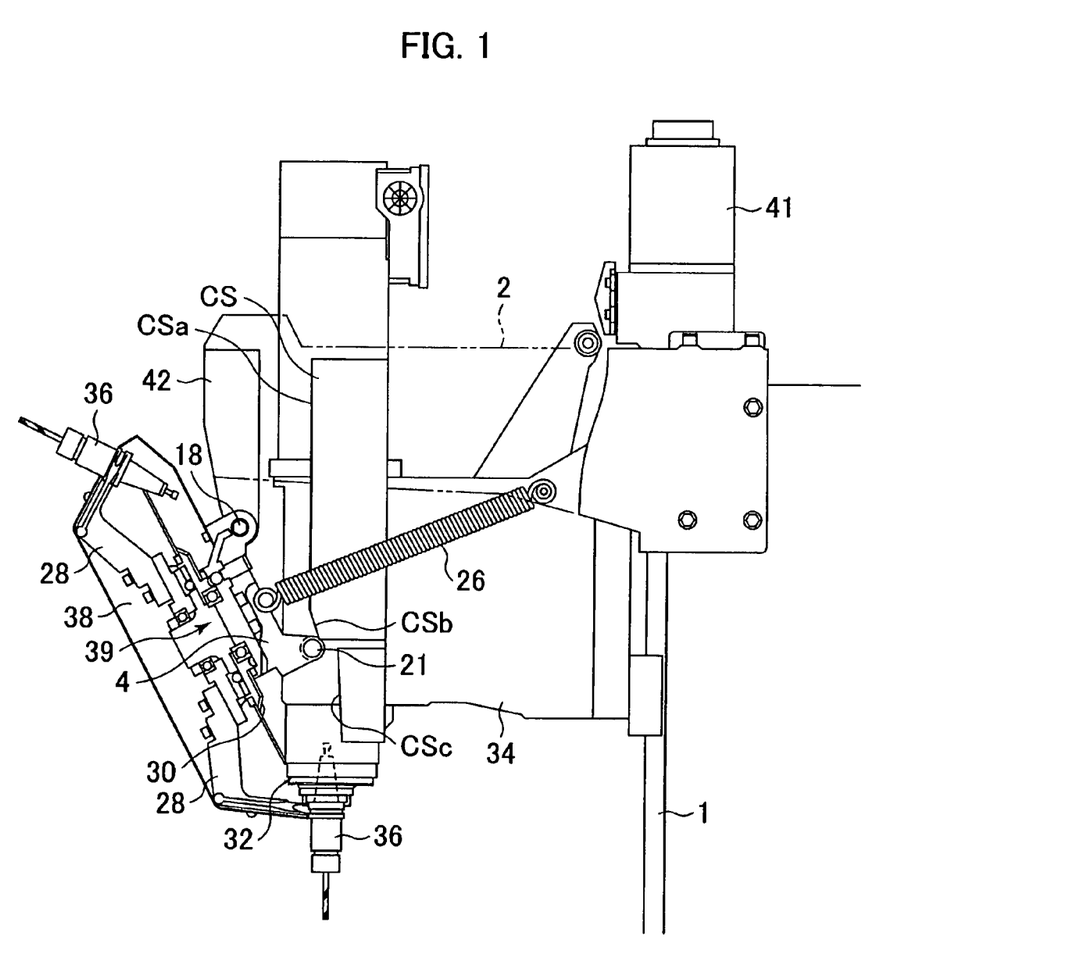
FIG. 1 is a schematic diagram of an automatic tool changing device according to the present invention.

FIG. 1 is a schematic diagram of an automatic tool changing device of an embodiment of the present invention. Elements identical to those of the conventional automatic tool changer shown in FIG. 11 are given the same reference numerals. The difference between the automatic tool changing device of the present embodiment of the present invention and the conventional automatic tool changer shown in FIG. 11 is that the lift mechanism of the latter, which moves the turret 38 up and down during tool exchange, is not provided in the former. Specifically, the lift lever 8, the lift link 14, the lift slider 16, the lift roller 22, the linear guide 40 and the lift cam CL shown in FIG. 11 are not provided, and moreover, the pivot shaft 18 that pivotally supports the crank 4 so that the latter rotates is mounted on a bracket that is fixedly mounted on the arm member 2. The remainder of the structure is the same as that shown in the conventional automatic tool changer shown in FIG. 11.

In operation as well, the lift movement that raises and lowers the turret 38 when the turret 38 is swung during tool exchange is no longer present in the present embodiment, the distinctive feature of which is that, instead of the conventional lift movement, the velocity of the Z-axis that drives the spindle head 34 is controlled so that no impact occurs with tool exchange.

Figure 2A:
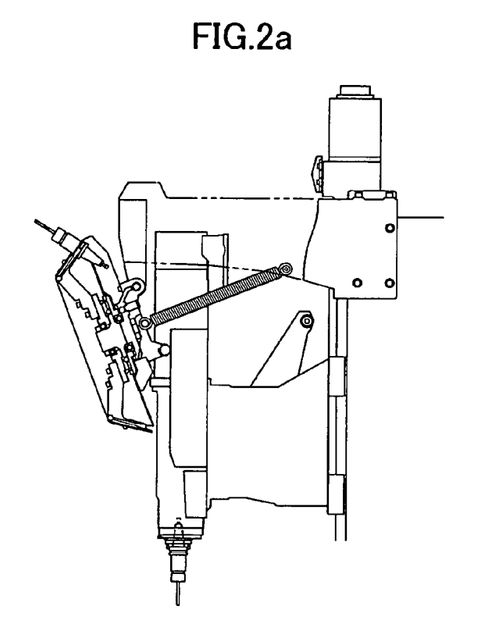
FIG. 2a-2d are diagrams showing an operation of the automatic tool changing device in detaching a tool from a spindle.
Figure 2B:
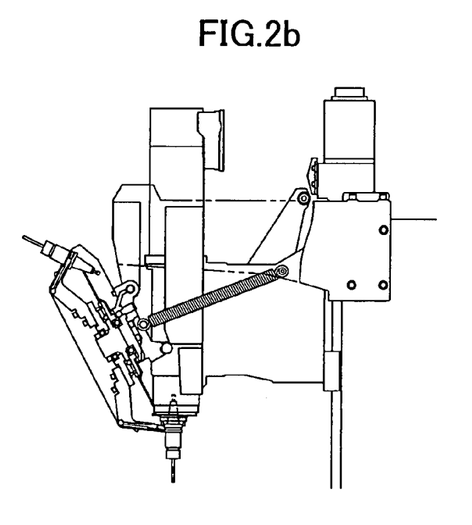
Figure 2C:
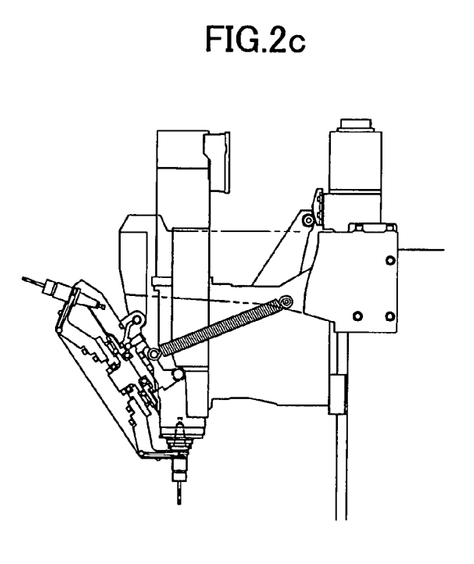

FIGS. 2a-2d show an operation of the tool changing device in detaching a tool from a spindle of a machine tool. FIG. 2a shows a state of the machine tool during machining in which the Z-axis (spindle head 34) is positioned at a lower machining region. In this state, when a tool exchange command is issued, the Z-axis (spindle head 34) starts to ascend and the ascending motion of the Z-axis (spindle head 34) is stopped at an origin of Z-axis where the swing roller (cam roller) 21 is positioned at a start point of the curved portion CSb of the swing cam CS to start a swing motion of the turret 38, as shown in FIG. 2b. While the Z-axis is stopped, an orientation of the spindle is carried out and the Z-axis (spindle head 34) starts to ascend again. The ascent of the Z-axis (spindle head 34) causes the swing roller 21 to move over the curved portion CSb of the sewing cam CS, the turret 38 starts to swing counterclockwise around the pivot shaft 18 and the tip of the grip 28 engages the V groove of the tool holder 36, as shown in FIG. 2c. As the Z-axis (spindle head 34) continues to ascend the turret 38 moves under the spindle head 34 so that the tool holder 36 is detached from the spindle. This movement is the same as that of the conventional automatic tool changer shown in FIG. 11.

Figure 2D:
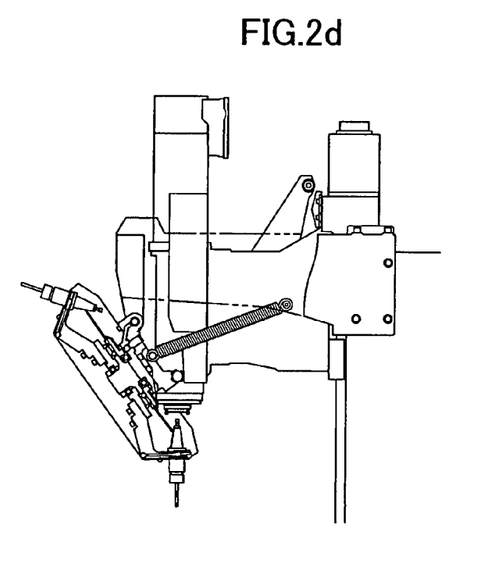

After the ascent of the Z-axis (spindle head 34) is finished, and the spindle gear 32 and the turret gear 30 of the decelerator device 39 are engaged, the spindle rotates and allocation of a desired tool is executed. After turret allocation is finished, the Z-axis (spindle head 34) descends in reverse order of the procedure described above and the spindle accepts the tool holder 36 from the grip 28. This tool exchange movement differs from the operation of the conventional tool change described above only in that the turret is moved along the Z-axis (vertically) so as to lessen the impact.

In the present embodiment, the lessening of the impact is carried out not with a cam mechanism but by controlling the Z-axis feed velocity.

Figure 3A:
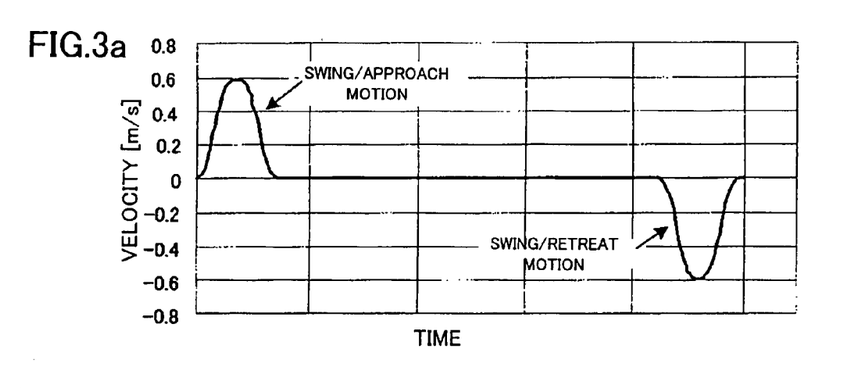
FIGS. 3a and 3b are diagrams showing an ideal velocity pattern of a swing motion of a turret, and a velocity pattern of a Z-axis motion which provides the velocity pattern of the swing motion of the turret, respectively.
Figure 3B:
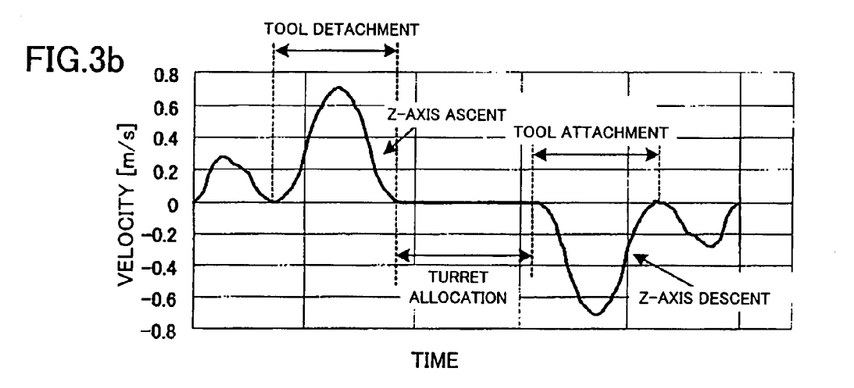

FIGS. 3a and 3b show an ideal turret 38 swing velocity pattern (velocity diagram) and an ideal Z-axis movement velocity pattern that varies the swing velocity pattern of the turret 38 employed in the embodiment (Z-axis movement velocity diagram), respectively. The ideal swing here means movement that is smooth and without impact, in other words movement in which the rate of change in acceleration is limited, of which a modified sine wave and a cycloid are well-known examples. In the present embodiment, a relatively easy-to-describe bell-shaped acceleration/deceleration curve (constant jerk=velocity waveform in which the rate of change in acceleration is constant) is used.

As shown in this ideal graph, to make the swing acceleration zero smoothly at the end of the swing the Z-axis employs a two-stage move that includes a stop.

If the turret 39 swing is sufficiently slow, there is no need to take the change in the velocity of the Z-axis into account and by moving at sufficiently low velocity stable tool exchange is achieved. However, for efficiency's sake, tool exchange in a machine tool requires that the tool exchange operation be completed in a minimum amount of time in order to reduce machine tool down-time, and therefore lengthening the time required for tool exchange is not desirable.

To achieve tool replacement quickly, a combination of a smooth turret 38 swing that creates no impact and a smooth Z-axis (spindle head 34) velocity is necessary. The swing movement depends on the cam surface of the swing cam CS, and the velocity of that movement is determined by the velocity of the swing cam CS, that is, the Z-axis (spindle head 34). Since the ratio of Z-axis movement dependent upon the shape of the cam surface of the swing cam CS and the swing velocity constantly changes so as to obtain a stable, ideal swing, there can be no discrepancy between the change in the swing movement velocity and the Z-axis (spindle head 34) velocity. Rather, what is required is a velocity waveform that cannot be defined by the algorithm of a bell-shaped acceleration/deceleration curve and is distorted to some extent like that shown in FIG. 3b.

Accordingly, first, the ideal swing movement velocity diagram (velocity pattern) is defined as shown in FIG. 3a and the turret 38 is moved according to the velocity diagram. The swing velocity diagram is integrated and the relation between time and swing position obtained. Next, the position on the cam surface of the swing cam CS that the swing roller 21 that positions the turret 38 in the swing position at each moment should contact is obtained. In other words, the Z-axis coordinate (the position of the spindle head 34) is obtained. Once the Z-axis position (spindle head 34 position) at which the ideal swing velocity diagram is obtained is thus acquired, the Z-axis (spindle head 34) velocity at each moment can be obtained by differentiating Z-axis position by time. In other words, the ideal swing is translated into Z-axis movement via the cam surface. The Z-axis (spindle head 34) velocity diagram thus obtained is shown in the graph in FIG. 3b. It should be noted that it is not always necessary to obtain the Z-axis (spindle head 34), it being sufficient to obtain the position of the Z-axis (spindle head 34) with respect to time.

It should be noted that, although the Z-axis velocity waveform is distorted, mechanically this distortion does not pose a significant problem. That the Z-axis movement itself is smooth movement without impact also is clear from the velocity diagram shown in FIG. 3b.

Thus, as described above, if the Z-axis velocity diagram can be obtained, then the driving of the Z-axis servo motor 41 may be controlled based on this Z-axis velocity diagram.

In the present embodiment, in order to implement this swing of the turret 38 during tool exchange as well as the Z-axis velocity diagram during detachment of the tool from the spindle and attachment of the tool to the spindle, the Z-axis velocity diagram (velocity pattern) is subdivided into tiny blocks.

Figure 4:
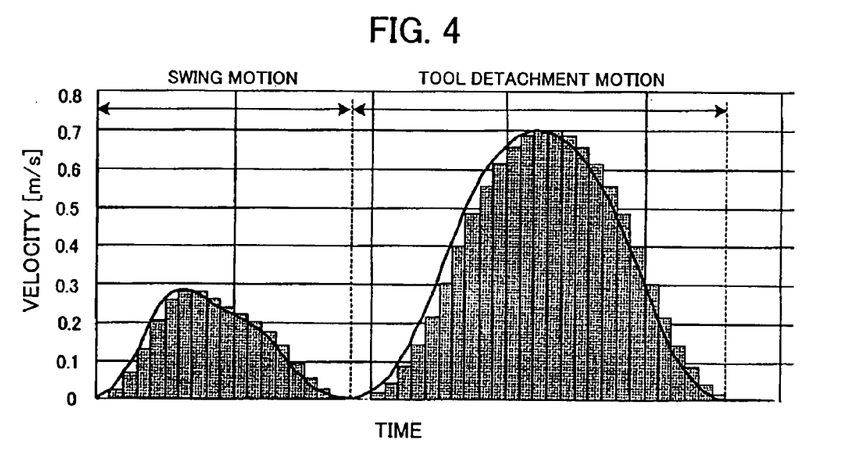
FIG. 4 is a diagram illustrating an example of the velocity pattern of the Z-axis motion subdivided into small blocks.

FIG. 4 shows an example of the velocity pattern (velocity diagram) of the ascent motion of the Z-axis subdivided into tiny blocks. Although in FIG. 4, the velocity pattern during the tool detachment and attachment is subdivided, only an interval of the swing motion of the turret 38 may be subdivided since the impact occurs when the turret is swinging. In addition, the whole interval of reciprocal vertical movement of the Z-axis (spindle head 34) for the tool exchange may be subdivided.

In the case where the velocity pattern is divided by an interpolation/distribution period at which each motion command is distributed to each axis by the numerical controller that controls the machine tool, motion amounts in respective interpolation/distribution periods which correspond to velocities in respective periods (since the motion amount per distribution period means the velocity) may be set in the storage means of the numerical controller.

Thus, as described above, by setting and registering the Z-axis motion amount per interpolation period in the storage means so as to acquire the Z-axis velocity diagram (velocity pattern) thus obtained, and reading at each distribution period the motion amount per distribution period stored in the storage means and controlling the driving of the Z-axis servo motor 41 at least in the interval through which the turret 38 swings during tool exchange, the Z-axis, that is, the spindle head 34, moves along an ideal velocity diagram (velocity pattern) like that shown in FIG. 3b. As a result, the swing of the turret 38 created by the swing cam CS and the swing roller working together becomes a velocity diagram (velocity pattern) like that shown in FIG. 3a.

This system in which the motion amount of the Z-axis per interpolation period is stored in the storage means and the data read at each interpolation period requires a lot of capacity from the storage means, and therefore motion amounts only in the interval through which the turret 38 swings are stored in the storage means, after which motion amounts may be read from the storage means and the Z-axis driven through other interval using the usual numerical controller commands.

The foregoing example describes a so-called path table operation, in which the motion amounts for respective distribution periods are set in the storage means and the set motion amount is read at each distribution period to drive the Z-axis servo motor. Alternatively, however, the Z-axis velocity diagram (velocity pattern) may be divided into a plurality of intervals by a time period longer that the distribution time period. In that case, the motion amount and movement velocity of each movement block of the intervals are set in the numerical controller, and when a tool exchange operation is commanded movement of each block is executed in order with the set motion amount and velocity. Such an arrangement is not especially different from the usual NC program, the only difference being the addition of a velocity command at each block. In the case of this example, there is no especially great difference between it and the usual numerical controller command system, and therefore this system may be implemented over the Z-axis (spindle head 34) reciprocal vertical movement interval in its entirety. Alternatively, data may be stored and this system implemented only when the turret 38 is swinging.

Figure 5:
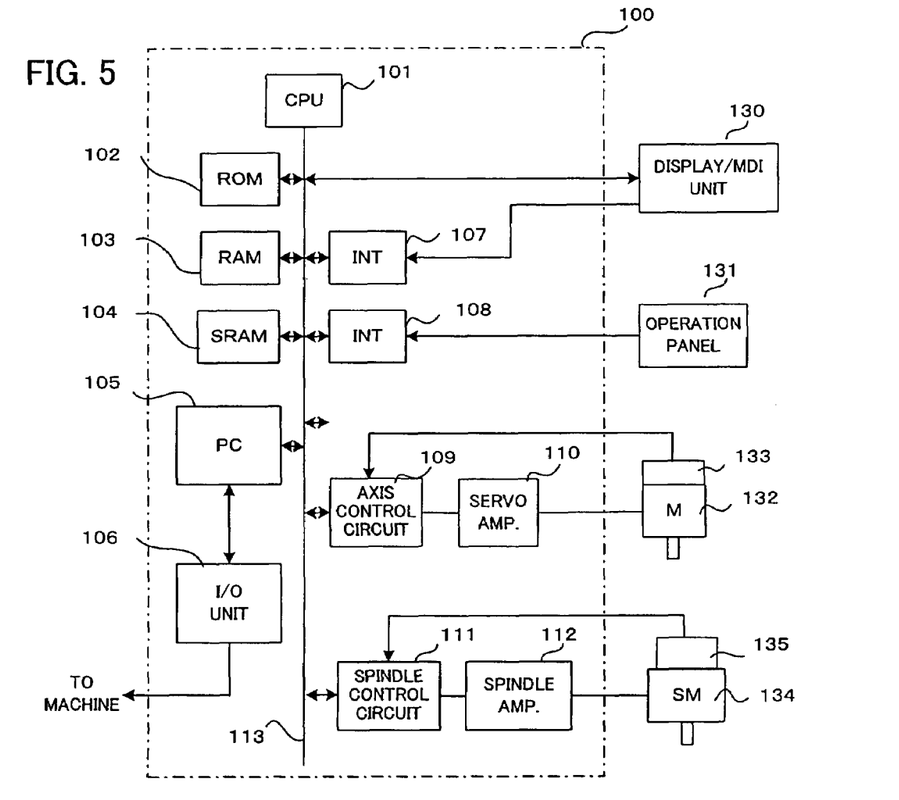
FIG. 5 is a schematic diagram of a numerical controller for controlling a machine tool for use in the present invention.

FIG. 5 is a schematic diagram of the essential parts of a numerical controller used in the present embodiment. A CPU 101 is a processor that controls a numerical controller 100 as a whole. The CPU 101 reads out a system program stored in a ROM 102 via a bus 113 and controls the entire numerical controller in accordance with the system program. A RAM 103 stores a variety of types of data, including temporary calculation data and display data as well as data that an operator inputs using a display device/MDI unit 130 comprising manual input means composed of a keyboard, a display device composed of a CRT, liquid crystal display or the like, and so forth. A SRAM 104 is a nonvolatile memory that maintains its memory state when the numerical controller 100 power is switched OFF, and is backed up by a battery, not shown.

A PC (program controller) 105 outputs control signals via an I/O unit 106 to a tool changer or other auxiliary apparatus of a machine tool that is the object of control by a sequence program stored in the numerical controller 100. In addition, the PC 105 receives signals from switches and the like on an operation panel 131 provided on the main unit of the machine tool that is the object of control by the numerical controller 100 and transmits them to the CPU 101 after performing the necessary signal processing.

The display device/MDI unit 130 is connected directly to the bus 113 as well as connected indirectly to the bus through an interface 107 for manually input signals.

A Z-axis shaft control circuit 109 that drives the spindle head 34 receives a motion order amount from the CPU 101 that it then outputs to a Z-axis servo amp 110. The servo amp 110 takes this command and drives a Z-axis servo motor 132. The servo motor 132 has a built-in position/velocity detector 133. Position and velocity feedback signals from the position/velocity detector 133 are fed back to the shaft control circuit 109 to provide position/velocity feedback control based on the motion command from the CPU 101 and the position and velocity feedback.

In addition, a spindle control circuit 111 receives spindle rotation commands from the CPU 101 as well as feedback pulses synchronized to the rotation of a spindle motor 134 from a position coder 135, carries out feedback control of the velocity, and outputs spindle velocity signals to a spindle amp 112. The spindle amp 112 receives the spindle velocity signals and rotates the spindle motor 134 at the ordered rotation velocity.

It should be noted that, in the example of the numerical controller shown in FIG. 5, only the essential parts relating to the present invention are shown. The Z-axis motor for moving the spindle head 34 reciprocally vertically, its control system, and the spindle motor and its control system are shown, whereas the motors for the remaining X-axis and Y-axis shafts, and their associated control systems, are omitted.

Accordingly, although motion amount and velocity may be set at command blocks and the commands of each block executed in sequence so that tool exchange is carried out by ordinary NC program commands as described above, in order to easily accommodate a variety of machines an arrangement in which an interval through which the turret 38 swings is processed on the basis of parameter setting data is described below as a first embodiment of the present invention. In this first embodiment, the velocity curve (velocity pattern) of the Z-axis (spindle head 34) of the interval through which the turret 38 swings is divided into a plurality of intervals, motion amounts and velocities of motion blocks of each interval are set and stored in a memory, and distribution motion command amounts at each block are output to the Z-axis motor based on these set motion amounts and velocities.

Figure 6:
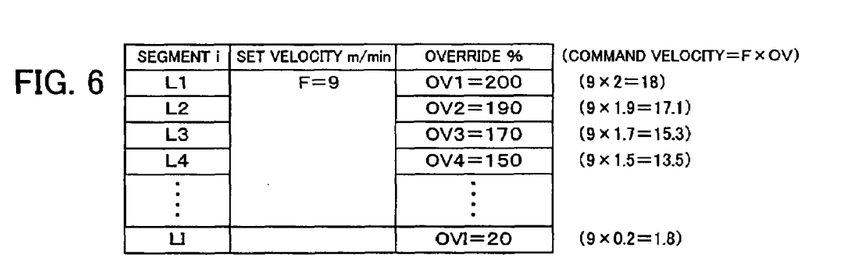
FIG. 6 is an example of axial motion data of the Z-axis divided into segments and set by parameters for respective segments during a swing motion of the turret.
Figure 7:
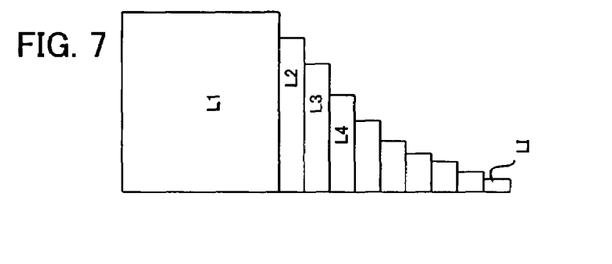
FIG. 7 is a diagram showing set velocities of the Z-axis motion according to the data set by parameters.

In the case of this first embodiment, as shown in FIG. 6, motion amounts L1-LI and velocities are set by parameters for motion blocks of segments "i". In the example shown in FIG. 6, the velocity is set by setting the same reference velocity for motion blocks L1-LI of all segments and an override value (percentage) at each segment. FIG. 7 shows changes in set motion velocity of the Z-axis according to this setting data. The example shown in FIG. 6 and FIG. 7 is that of the setting data used when swinging the turret 38 toward the spindle (that is, when the grip 28 engages the tool holder 36 mounted on the spindle), as well as the changes in set velocity. The set velocity (speed of ascent along the Z-axis) is set so as to decrease smoothly and gradually until it reaches 0 at the point at which the swing of the turret 38 ends.

It should be noted that, when a new tool holder 36 is attached to the spindle and the grip 28 is retreated from the tool holder 36, in the interval through with the turret 38 swings the velocity is set to increase smoothly and gradually from the start of the swing, although not shown in the diagram.

Figure 8:
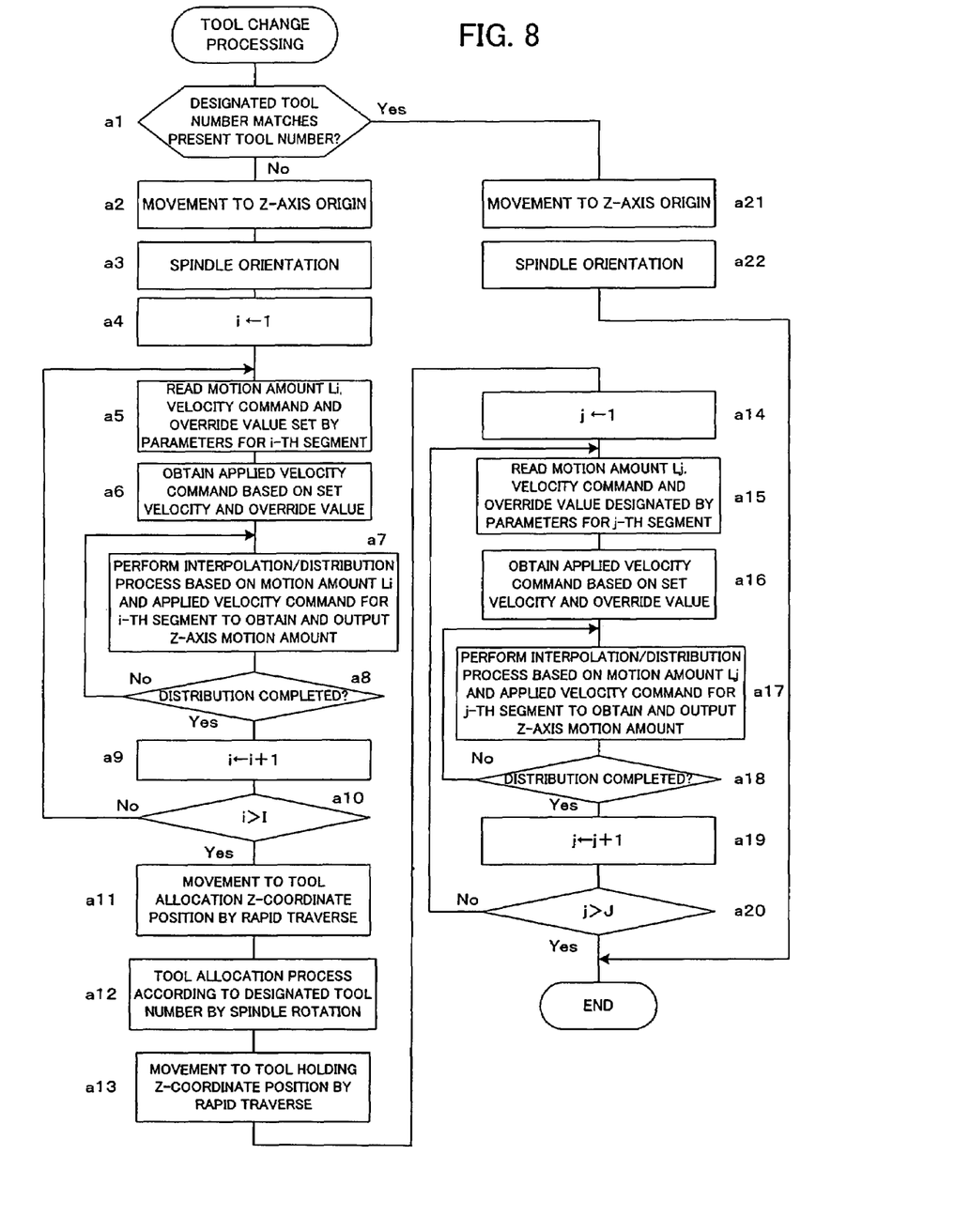
FIG. 8 is a flowchart showing an algorism of the tool change processing according to a first embodiment of the present invention.

FIG. 8 is a flow chart illustrating an algorithm of processing that the numerical controller executes in the first embodiment.

When a tool exchange command is inputted, a tool number that is designated together with the tool exchange command and the presently selected tool number are compared to determine whether or not they match (Step a1). If they do match, then a motion command that causes the Z-axis to move to the Z-axis origin is output to the Z-axis control circuit 109, the Z-axis servo motor 132 is driven via the servo amp 110, and, as shown in FIG. 2B, the Z-axis (spindle head 34) is positioned at the origin position of the Z-axis (Step a21). Then, the spindle motor 134 is driven via the spindle control circuit 111 and the spindle amp 112, a spindle orientation is executed so as to position the spindle at a predetermined rotation position (Step a22), and the tool exchange process is ended.

By contrast, if the designated tool number and the presently selected tool number do not match, then, as shown in FIG. 2B, the Z-axis (spindle head 34) is positioned at the origin position of the Z-axis (Step a2) and spindle orientation is executed so as to position the spindle at a rotation position at which the tool (the tool holder 36) is detached (Step a3). It should be noted that, in the present embodiment, in Steps a2 and a3, as well as Steps a21 and a22, orientation of the spindle is executed after the spindle is moved to the Z-axis origin. Alternatively, however, the spindle may be rotated while it is being moved to the Z-axis origin and orientation carried out simultaneously.

Next, an index i for reading setting data is set to "1" (Step a4), and the motion amount Li and speed command as well as override value for the i-th segment set by parameters are read (Step a5). The velocity command is multiplied by the override value to obtain an applied velocity command (Step a6), an interpolation distribution process of a motion command is performed based on the read motion amount Li and the applied velocity command, and the motion amount in the distribution period of the Z-axis is obtained and output to the Z-axis control circuit to drive the Z-axis motor (Step a7). Next, it is determined whether or not distribution of the motion amount Li designated in a motion block of the present segment i is completed (Step a8). If distribution is not finished, processing returns to Step a7, the motion amount for each distribution period is obtained and output to the Z-axis control circuit 109, the Z-axis servo motor 132 is driven so that the Z-axis (spindle head 34) rises. Then, when distribution is finished, the index i is incremented by "1" (Step a9) and it is determined whether or not the index i exceeds the number of segments I (Step a10), and if not, processing returns to Step a5 and the routine of Step a5 to Step a10 is executed.

If the index i exceeds the set number of segments I and the swing of the turret 38 is completed (the state shown in FIG. 2c), then, as conventionally, the Z-axis (spindle head 34) is moved by rapid traverse to a tool allocation Z-axis coordinate position where the spindle gear 32 is engaged with the turret gear 30 of the decelerator device 39 (Step a11). In this state, as shown in FIG. 2d, the tool holder 36 is detached from the spindle, so that the spindle does not interfere with the tool holder 36. Thereafter, as conventionally, the turret 38 is rotated and tool allocation of the designated tool number is carried out (Step a12). Next, the Z-axis (spindle head 34) is lowered by rapid traverse to a position where the allocated tool is held (Step a13), to thereby attached a new tool holder 36 to the spindle.

Next, an index j for reading setting data for the interval through which the turret 38 is swung in order to detach the grip 28 from the tool holder 36 attached to the spindle is set at "1" (Step a14). The motion amount Lj and velocity command as well as override value set by parameter for the j-th segment are then read (Step a15). The velocity command is multiplied by the override value to obtain the applied velocity command (Step a16), an interpolation distribution process is performed on the motion command using the read motion amount Lj and the applied velocity command, so that the motion amount in the distribution period of the Z-axis is obtained and output to the Z-axis control circuit to drive the Z-axis motor (Step a17). Next, it is determined whether or not distribution of the motion amount Lj designated in a motion block of the present segment j is completed (Step a18). If distribution is not finished, processing returns to Step a17 and the motion amount for each distribution period is obtained and output to the Z-axis servo motor. Then, when distribution is finished, the index j is incremented by "1" (Step a19) and it is determined whether or not the index j exceeds the number of segments J (Step a12), and if not, processing returns to Step a15 and the routine of Step a15 to Step a20 is executed.

If the index j exceeds the set number of segments J and the swinging of the turret 38 is finished, the tool exchange process is ended.

Figure 9:
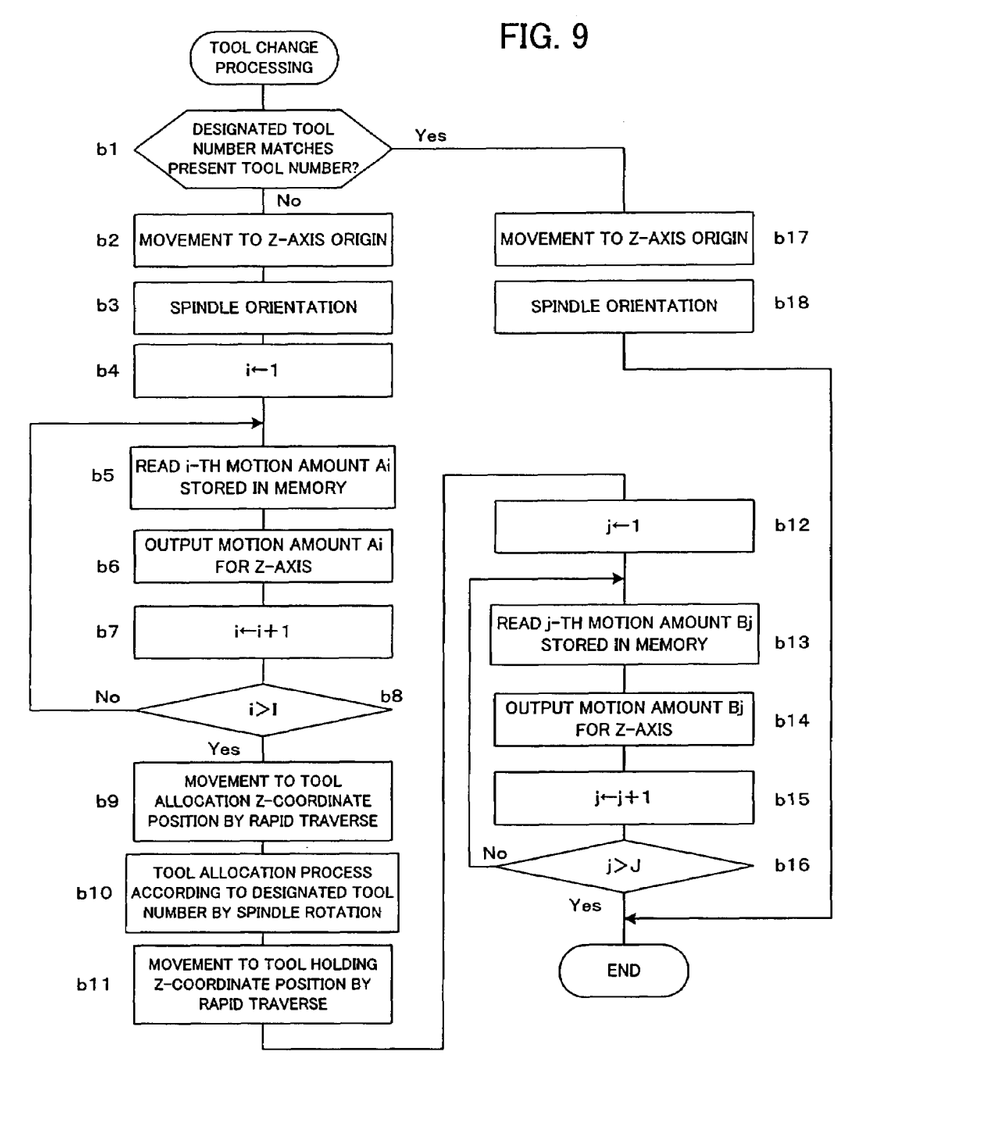
FIG. 9 is a flowchart showing an algorism of the tool change processing according to a second embodiment of the present invention.
Figure 10A:
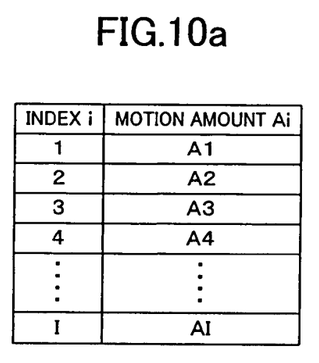
FIGS. 10a and 10b are examples of data of respective motion amounts stored in a memory according to the second embodiment.
Figure 10B:
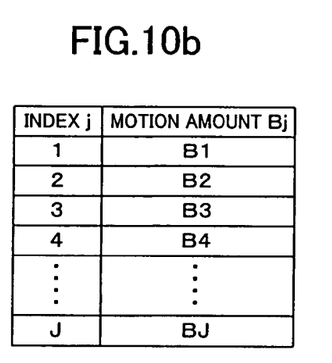

FIG. 9 is a flow chart illustrating an algorithm of a tool exchange process of a second embodiment of the present invention. In the second embodiment of the present invention, the motion amount of the Z-axis (spindle head 34) in the interval through which the turret 38 swings is set in the SRAM 104 for each distribution period as shown in FIGS. 10a and 10b, such that, when the interval through which the turret 38 swings arrives, the motion amount is read out at each distribution period and output to the Z-axis. FIGS. 10a and 10b illustrate contents of the memory for storing motion amounts for respective distribution periods. FIG. 10a illustrates motion amounts A1-AI set in memory when the turret 38 swings as the grip 28 is inserted into the tool holder 36 mounted on the spindle. FIG. 10b illustrates Z-axis motion amounts B1-BJ set in memory when the grip 28 is detached from the tool holder 36 mounted on the spindle. It should be noted that i, j are indices indicating the order in which these motion amounts are output.

When a tool exchange command is inputted, the processor 11 of the numerical controller executes the processing shown in FIG. 9.

The difference between the flow chart shown in FIG. 9 and the first embodiment shown in FIG. 8 is in the processing of the segments through which the turret swings in Steps b5 to b8 and Steps b12 to b16. Steps b1 to b4 are identical to Steps a1 to a4 shown in FIG. 8 and Steps b9 to b12 are identical to Steps a11 to a14 shown in FIG. 8, and therefore the description concentrates on the point of difference.

When a tool exchange command is inputted and the designated tool number and the presently selected tool number are different, the Z-axis is moved to the Z-axis origin, orientation of the spindle is carried out (Steps b1 to b3), and the index i that specifies a memory location of the motion amount set for the distribution period in the interval through which the turret 38 swings in a direction of inserting the grip 28 into the tool holder 36 attached to the spindle is set to "1" (Step b4). Then, the i-th motion amount in the memory is read (Step b5) and the read motion amount is output to the Z-axis control circuit to drive the Z-axis motor, so that the Z-axis (spindle head 34) rises (Step b6). Next, the index i is incremented by "1" (Step b7), and it is determined whether or not the index i exceeds a motion amount set number I (Step b8), and if not, processing returns to Step b5. Thereafter, the routine of Steps b5 to b8 is executed at each distribution period and the Z-axis driven until the index i exceeds the setting number I.

Thus, as described above, when the process of raising the Z-axis (spindle head 34) of the interval through which the turret 38 swings and the swinging of the turret 38 stops, by rapid traverse the Z-axis (spindle head 34) is raised to a tool allocation position, the spindle is rotated and tool allocation of the designated tool number is carried out, the Z-axis (spindle head 34) is lowered, and the designated tool number tool holder 36 is held by the spindle (Step b9 to Step b11).

Next, the index j that specifies the memory location at which the motion amounts for each distribution period of the interval through which the turret swings in a direction for detaching the grip 28 from the tool holder 36 attached to the spindle are set is set at "1" (Step b12). Them, the j-th motion amount in the memory is read out (Step b13) and the read motion amount is output to the Z-axis control circuit to drive the Z-axis motor, so that the Z-axis (spindle head 34) is lowered (Step b14). Next, the index j is incremented by "1" (Step b15) and it is determined whether or not index j exceeds a motion amount set number J (Step b16), and if not, processing returns to Step b13. Thereafter, the routine of Steps b13 to b15 is executed at each distribution period and the Z-axis driven until the index j exceeds the setting number J.

When the index j exceeds the set number J, and the grip 28 is detached from the tool holder 36 attached to the spindle and the swing of the turret 38 is completed, the tool exchange process is ended.

Thus, smooth tool exchange by swinging is executed by the method described above. It should be noted that, where impact occurs due to a difference in velocity between the tiny blocks or because the swing movement or the Z-axis movement has become unstable, a smoothed velocity waveform may be created using any already well-known post-interpolation acceleration/deceleration control capability, so as to achieve stable, smooth swinging without impact.

Further, in the foregoing embodiment, a cam mechanism is employed as means for swinging the turret utilizing the axial motion of the spindle head, however a linkage mechanism comprising cranks and links may be employed in place of the cam mechanism.

What is claimed is:

1. A method of changing a tool attached to a spindle of a machine tool, controlled by a numerical controller, with a desired tool by an automatic tool changing device which comprises a spindle head rotatably supporting the spindle and arranged axially movable, a turret for holding one or more tools with a plurality of grips arranged along an outer periphery thereof, said turret being supported rotatably about a rotary axis for allocating a desired tool to a tool changing position and also swingably about a pivot axis for attaching/detaching the tool to/from the spindle, and a mechanism for making a swing motion of said turret towards and away from the spindle utilizing only an axial motion of said spindle head, said method comprising:

defining a target velocity pattern of the swing motion of said turret;

determining angular positions of said turret with respect to time in the swing motion based on the target velocity pattern;

determining axial positions of said spindle head with respect to time based on the determined angular positions of said turret with respect to time;

preparing a motion program such that said spindle head takes the determined axial positions with respect to time; and controlling the axial motion of said spindle head according to the prepared motion program by the numerical controller so as to change the tool on the spindle with the desired tool.

2. An automatic tool changing device for a machine tool controlled by a numerical controller to change a tool attached to a spindle of the machine tool with a desired tool, comprising:

a spindle head supporting the spindle rotatably and arranged axially movable;

a turret configured to hold one or more tools with a plurality of grips arranged along an outer periphery thereof, said turret being supported rotatably about a rotary axis for allocating the desired tool to a tool changing position and also swingably about a pivot axis for attaching/detaching the tool to/from the spindle;

a mechanism configured to make a swing motion of said turret toward and away from the spindle utilizing only an axial motion of said spindle head;

storage means storing axial motion data of said spindle head for a plurality of motion segments obtained by dividing the axial motion of said spindle head during the swing motion of said turret so that the swing motion of said turret is performed according to a target velocity pattern such that the swing motion towards the spindle is smoothly decelerated to an end point thereof and the swing motion away from the spindle is smoothly accelerated from a start point thereof, and so that a velocity of the axial motion of said spindle head has a minimum value at the end point of the swing motion of said turret towards the spindle and the start point of the swing motion of said turret away from the spindle; and spindle head driving means controlled by the numerical controller based on the axial motion data of said spindle head stored in said storage means to axially move said spindle head so as to make the swing motion of said turret.

3. An automatic tool changing device for a machine tool according to claim 2, wherein the minimum value of the velocity of the axial motion of said spindle head in the axial motion data stored in said storage means is zero.

4. An automatic tool changing device for a machine tool according to claim 2, wherein the axial motion data of said spindle head stored in said storage means comprises motion amounts and velocities in blocks of the plurality of motion segments, and said spindle head driving means drives said spindle head based on the velocities and the motion amounts read from the respective blocks.

5. An automatic tool changing device for a machine tool according to claim 2, wherein the axial motion of said spindle head during the swing motion of said turret is divided by distribution periods in which the numerical controller distributes motion commands to respective control axes of the machine tool, and the axial motion data stored in said storage means comprises motion amounts for respective distribution periods, and said spindle head driving means drives said spindle head by the motion amounts read from said storage means at respective distribution periods.

6. An automatic tool changing device for a machine tool according to claim 2, wherein said mechanism for making the swing motion of said turret comprises a cam mechanism having a cam and a cam follower.

7. An automatic tool changing device for a machine tool according to claim 2, wherein the axial motion data of said spindle head comprises axial positions of said spindle head with respect to time determined based on angular positions of said turret with respect to time during the swing motion of said turret according to a target velocity pattern.

8. An automatic tool changing device for a machine tool according to claim 7, wherein the angular positions of said turret with respect to time are determined by integrating a velocity of the swing motion of said turret according to the target velocity pattern.

9. An automatic tool changing device for a machine tool according to claim 7, wherein said mechanism for making the swing motion of said turret comprises a cam mechanism having a cam provided integrally with said spindle head and a cam follower rotatably supported by said turret.

10. An automatic tool changing device for a machine tool according to claim 9, wherein the axial positions of said spindle head are determined as axial positions of said spindle head at which the cam is in contact with the cam follower at the angular positions of said turret with respect to time.

* * * * *

UNITED STATES PATENT AND TRADEMARK OFFICE
CERTIFICATE OF CORRECTION

| | |
|---|---|
| PATENT NO. | : 7,445,587 B2 |
| APPLICATION NO. | : 11/724187 |
| DATED | : November 4, 2008 |
| INVENTOR(S) | : Kunio Kojima et al. |

It is certified that error appears in the above-identified patent and that said Letters Patent is hereby corrected as shown below:

Column 5, Line 25, change "FIG." to --FIGS.--.

Column 10, Line 55, change "all)." to --a 11).--.

Column 12, Line 8, change "bill)." to --b 11).--.

Column 12, Line 13, change "Them," to --Then,--.

Signed and Sealed this

Twentieth Day of January, 2009

JON W. DUDAS
*Director of the United States Patent and Trademark Office*